United States Patent
Kim et al.

(10) Patent No.: US 9,898,090 B2
(45) Date of Patent: Feb. 20, 2018

(54) APPARATUS, METHOD AND RECORDING MEDIUM FOR CONTROLLING USER INTERFACE USING INPUT IMAGE

(71) Applicant: Samsung Electronics Co., Ltd., Suwon-si, Gyeonggi-do (KR)

(72) Inventors: Jin-Yong Kim, Yongin-si (KR); Ji-Young Kang, Suwon-si (KR); Dae-Sung Kim, Seoul (KR); Seok-Tae Kim, Daejeon (KR); Bo-Young Lee, Seoul (KR); Seung-Kyung Lim, Seoul (KR); Jin-Young Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 14/478,399

(22) Filed: Sep. 5, 2014

(65) Prior Publication Data

US 2015/0070272 A1 Mar. 12, 2015

(30) Foreign Application Priority Data

Sep. 10, 2013 (KR) ........................ 10-2013-0108697

(51) Int. Cl.
| | |
|---|---|
| *G06F 3/0481* | (2013.01) |
| *G06F 3/01* | (2006.01) |
| *G06F 3/03* | (2006.01) |
| *G06F 3/00* | (2006.01) |
| *G06K 9/00* | (2006.01) |
| *H04N 5/232* | (2006.01) |

(52) U.S. Cl.
CPC .............. *G06F 3/017* (2013.01); *G06F 3/005* (2013.01); *G06F 3/011* (2013.01); *G06F 3/0304* (2013.01); *G06K 9/00302* (2013.01); *G06K 9/00335* (2013.01); *H04N 5/232* (2013.01); *H04N 5/23216* (2013.01); *H04N 5/23219* (2013.01); *G06F 2203/0381* (2013.01); *H04N 5/23293* (2013.01)

(58) Field of Classification Search
CPC .......... G06F 3/005; G06F 3/011; G06F 3/017; G06F 3/0304; H04N 5/23212; H04N 5/23216; H04N 5/23219; H04N 5/23293
See application file for complete search history.

(56) References Cited

U.S. PATENT DOCUMENTS

| | | | | |
|---|---|---|---|---|
| 7,489,303 | B1 * | 2/2009 | Pryor | ..................... B60K 35/00 345/173 |
| 9,110,541 | B1 * | 8/2015 | Zhou | ....................... G06F 3/042 |
| 9,160,993 | B1 * | 10/2015 | Lish | .................. H04N 5/23229 |
| 2002/0118880 | A1 * | 8/2002 | Liu | ..................... G06K 9/00335 382/199 |
| 2002/0143489 | A1 * | 10/2002 | Orchard | .................. G01P 13/00 702/141 |
| 2005/0024322 | A1 | 2/2005 | Kupka | |
| 2005/0212751 | A1 * | 9/2005 | Marvit | .................. G06F 1/1613 345/156 |
| 2005/0212767 | A1 * | 9/2005 | Marvit | .................. G06F 1/1626 345/158 |

(Continued)

FOREIGN PATENT DOCUMENTS

| | | |
|---|---|---|
| EP | 2 362 636 A1 | 8/2011 |
| EP | 2 631 739 A2 | 8/2013 |

(Continued)

*Primary Examiner* — Michael J Eurice
(74) *Attorney, Agent, or Firm* — Jefferson IP Law, LLP

(57) ABSTRACT

A method of controlling a user interface using an input image is provided. The method includes storing operation executing information of each of one or more gesture forms according to each of a plurality of functions, detecting a gesture form from the input image, and identifying the operation executing information mapped on the detected gesture form to execute an operation according to a function which is currently operated.

28 Claims, 18 Drawing Sheets

(56) References Cited

U.S. PATENT DOCUMENTS

| | | | |
|---|---|---|---|
| 2006/0028429 A1* | 2/2006 | Kanevsky | G06F 3/017 345/156 |
| 2006/0239591 A1* | 10/2006 | Kim | G06F 17/30038 382/305 |
| 2007/0018880 A1* | 1/2007 | Huston | A63B 24/0021 342/45 |
| 2008/0147730 A1* | 6/2008 | Lee | G06Q 30/0212 |
| 2009/0037849 A1* | 2/2009 | Immonen | G06F 3/017 715/863 |
| 2009/0196507 A1* | 8/2009 | Park | G06K 9/00234 382/199 |
| 2010/0013943 A1* | 1/2010 | Thorn | H04N 5/232 348/222.1 |
| 2010/0046842 A1* | 2/2010 | Conwell | G06F 17/30265 382/218 |
| 2010/0048242 A1* | 2/2010 | Rhoads | G06F 17/30244 455/556.1 |
| 2010/0100439 A1* | 4/2010 | Jutla | G06Q 30/0254 705/14.52 |
| 2010/0120445 A1* | 5/2010 | Li | H04W 28/24 455/452.2 |
| 2010/0125815 A1* | 5/2010 | Wang | G06F 3/017 715/856 |
| 2010/0199232 A1* | 8/2010 | Mistry | G06F 1/163 715/863 |
| 2010/0257252 A1* | 10/2010 | Dougherty | G06K 9/00979 709/217 |
| 2011/0007035 A1* | 1/2011 | Shai | G06F 3/014 345/179 |
| 2011/0047517 A1* | 2/2011 | Lee | G06F 17/30265 715/863 |
| 2011/0052006 A1* | 3/2011 | Gurman | G06K 9/00201 382/103 |
| 2011/0052073 A1* | 3/2011 | Wallace | G06K 9/00704 382/190 |
| 2011/0072047 A1* | 3/2011 | Wang | G06F 17/30265 707/776 |
| 2011/0110560 A1 | 5/2011 | Adhikari | |
| 2011/0154266 A1* | 6/2011 | Friend | A63F 13/06 715/863 |
| 2011/0173565 A1* | 7/2011 | Ofek | G06T 5/50 715/790 |
| 2011/0187746 A1* | 8/2011 | Suto | G09G 5/00 345/634 |
| 2011/0199479 A1* | 8/2011 | Waldman | G01C 21/3602 348/116 |
| 2011/0211737 A1* | 9/2011 | Krupka | G06F 17/30247 382/118 |
| 2011/0211754 A1* | 9/2011 | Litvak | G06K 9/00375 382/165 |
| 2011/0244919 A1* | 10/2011 | Aller | G06K 9/00973 455/556.1 |
| 2011/0283223 A1* | 11/2011 | Vaittinen | G01C 21/3647 715/781 |
| 2011/0312374 A1* | 12/2011 | Chen | H04N 5/23222 455/556.1 |
| 2011/0313779 A1* | 12/2011 | Herzog | G06Q 10/10 705/1.1 |
| 2011/0314427 A1* | 12/2011 | Sundararajan | G06F 9/4443 715/863 |
| 2011/0319166 A1* | 12/2011 | Bathiche | A63F 13/12 463/40 |
| 2012/0075168 A1* | 3/2012 | Osterhout | G02B 27/017 345/8 |
| 2012/0092529 A1* | 4/2012 | Choi | H04N 5/23219 348/239 |
| 2012/0116559 A1* | 5/2012 | Davis | G06F 3/002 700/94 |
| 2012/0134548 A1* | 5/2012 | Rhoads | G06Q 30/06 382/118 |
| 2012/0197439 A1* | 8/2012 | Wang | B25J 9/1689 700/259 |
| 2012/0206452 A1* | 8/2012 | Geisner | G02B 27/017 345/419 |
| 2012/0275642 A1* | 11/2012 | Aller | H04M 1/72522 382/100 |
| 2012/0284012 A1* | 11/2012 | Rodriguez | G06Q 30/06 704/1 |
| 2012/0290950 A1* | 11/2012 | Rapaport | H04L 51/32 715/753 |
| 2012/0302289 A1 | 11/2012 | Kang | |
| 2013/0007765 A1* | 1/2013 | Yamashita | G06F 9/4881 718/107 |
| 2013/0083011 A1* | 4/2013 | Geisner | G09G 5/00 345/419 |
| 2013/0120445 A1 | 5/2013 | Shimomura et al. | |
| 2013/0222369 A1* | 8/2013 | Huston | G06T 17/00 345/419 |
| 2013/0223673 A1* | 8/2013 | Davis | G06K 9/78 382/100 |
| 2013/0239063 A1* | 9/2013 | Ubillos | H04L 51/24 715/838 |
| 2013/0260727 A1* | 10/2013 | Knudson | G06Q 30/00 455/414.1 |
| 2013/0286004 A1* | 10/2013 | McCulloch | G06T 19/006 345/419 |
| 2013/0307765 A1 | 11/2013 | Li | |
| 2013/0346168 A1* | 12/2013 | Zhou | G06F 1/163 705/14.4 |
| 2014/0052555 A1* | 2/2014 | MacIntosh | G06Q 20/208 705/23 |
| 2014/0080428 A1* | 3/2014 | Rhoads | G06F 17/30241 455/88 |
| 2014/0101578 A1* | 4/2014 | Kwak | G06F 3/017 715/761 |
| 2014/0121015 A1* | 5/2014 | Massing | G07F 17/3211 463/33 |
| 2014/0143725 A1* | 5/2014 | Lee | G06F 17/30017 715/834 |
| 2014/0184496 A1* | 7/2014 | Gribetz | G02B 27/017 345/156 |
| 2014/0201126 A1* | 7/2014 | Zadeh | G06K 9/627 706/52 |
| 2014/0225978 A1* | 8/2014 | Saban | H04N 1/622 348/14.07 |
| 2014/0226000 A1* | 8/2014 | Vilcovsky | G06F 3/017 348/77 |
| 2014/0226900 A1* | 8/2014 | Saban | G06T 7/0081 382/165 |
| 2014/0240354 A1* | 8/2014 | Ma | G06T 19/006 345/633 |
| 2014/0304665 A1* | 10/2014 | Holz | G06F 3/017 715/863 |
| 2014/0317559 A1* | 10/2014 | Wakefield | G06F 3/0481 715/788 |
| 2014/0357312 A1* | 12/2014 | Davis | G10L 25/48 455/550.1 |
| 2014/0361976 A1* | 12/2014 | Osman | G02B 27/0172 345/156 |
| 2015/0009349 A1* | 1/2015 | Kim | H04N 5/2258 348/218.1 |
| 2015/0016712 A1* | 1/2015 | Rhoads | G06K 9/00208 382/154 |
| 2015/0077326 A1* | 3/2015 | Kramer | G06F 3/0325 345/156 |

FOREIGN PATENT DOCUMENTS

| | | |
|---|---|---|
| KR | 10-2010-0118317 A | 11/2010 |
| KR | 10-2012-0093226 A | 8/2012 |
| KR | 10-2012-0132096 A | 12/2012 |

* cited by examiner

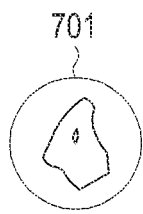
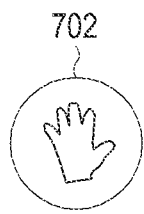
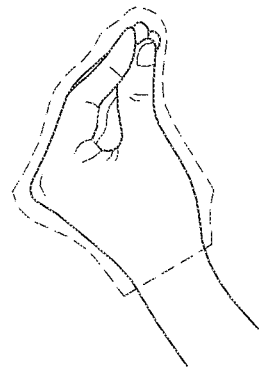
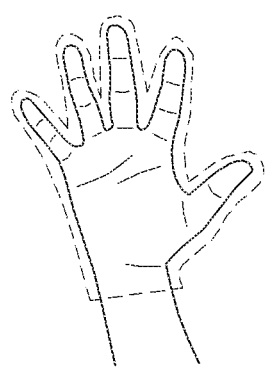
FIG.7A  FIG.7B
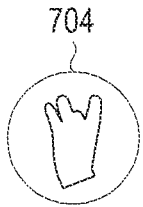
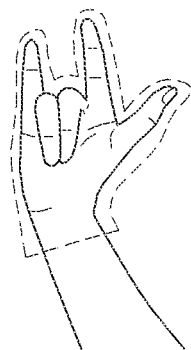
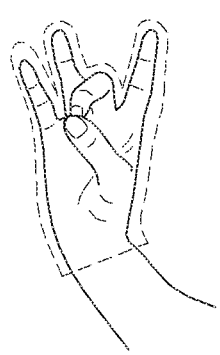
FIG.7C  FIG.7D

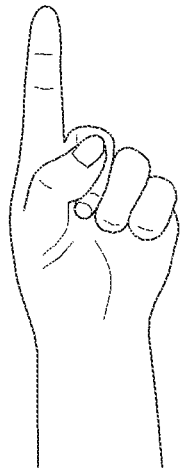
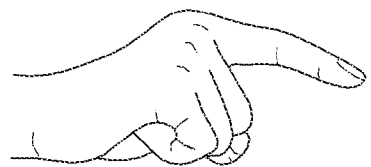
FIG.13A    FIG.13B
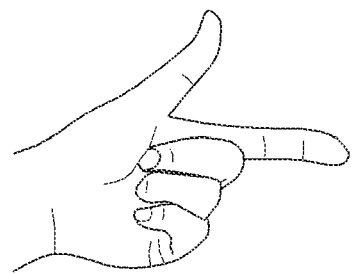
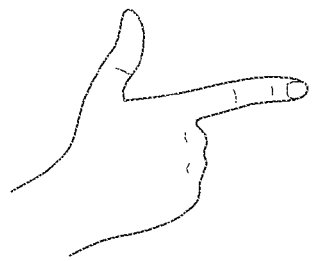
FIG.13C    FIG.13D

APPARATUS, METHOD AND RECORDING MEDIUM FOR CONTROLLING USER INTERFACE USING INPUT IMAGE

CROSS-REFERENCE TO RELATED APPLICATION(S)

This application claims the benefit under 35 U.S.C. § 119(a) of a Korean patent application filed on Sep. 10, 2013 in the Korean Intellectual Property Office and assigned Serial No. 10-2013-0108697, the entire disclosure of which is hereby incorporated by reference.

TECHNICAL FIELD

The present disclosure relates to an apparatus, a method and a recording medium for controlling a user interface of an electronic device using an input image.

BACKGROUND

Currently, as an electronic device such as a computer, a laptop computer, a tablet PC, a smart phone, a portable phone, and the like has a camera function, it is possible to conveniently take a picture of an image anywhere. Further, with the development of electronic technologies, the electronic device has various functions and provides various user interfaces for a user's convenience. The user interfaces have advantages in that a user is allowed to easily operate the electronic device so as to rapidly and intuitively transmit information. Currently, accordingly, technologies related to the user interfaces have been actively developed so that the user can conveniently use an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus, a method and a recording medium for controlling a user interface by using an input image in for order a user to execute various operations of an electronic device more easily. That is, when a user makes a certain gesture during use of the electronic device, the electronic device is allowed to recognize the certain gesture and execute an operation corresponding to the gesture.

In accordance with an aspect of the present disclosure, a method of controlling a user interface using an input image is provided. The method includes storing operation executing information of each of one or more gesture forms according to each of a plurality of functions, detecting a gesture form from the input image, and identifying the operation executing information mapped on the detected gesture form according to a function which currently operates.

In accordance with another aspect of the present disclosure, an apparatus for controlling a user interface using an input image is provided. The apparatus includes an image receiving unit configured to receive an input of an image, a storage unit, and a controller configured to enable the storage unit to store operation executing information of each of one or more gesture forms according to each of a plurality of functions, detect the gesture form from an image input through the image receiving unit, and identify and execute the operation executing information mapped on the detected gesture form according to a function which is currently operated.

In accordance with still another aspect of the present disclosure, a storage medium for controlling a user interface using an input image is provided. The storage medium includes an image receiving unit configured to receive an input of an image, a storage unit, and programs which operate a controller for enabling the storage unit to store operation executing information of each of one or more gesture forms according to each of a plurality of functions, detecting a gesture form from an image input through the image receiving unit, and identifying and executing the operation executing information mapped on the detected gesture form according to a function which is currently operated.

In accordance with still another aspect of the present disclosure a method of modifying an input image is provided. The method of modifying an input image includes receiving a gesture form via an image receiving unit, matching the gesture form to at least one of a plurality of stored gesture forms; and applying an object associated with the matched gesture form to the input image and displaying the input image with the applied object.

As described above, by using the apparatus, method and recording medium for controlling the user interface using an input image of the present disclosure, the user is allowed to easily operate the user interface, so as to execute various operations of the electronic device. That is, when the user makes a certain gesture while using the electronic device, the electronic device recognizes the certain gesture through an image input unit so that an operation corresponding to the certain gesture is executed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A, 7B, 7C, and 7D are views illustrating various gestures and metadata corresponding to each gesture for controlling the user interface using the image obtained through the camera according to the second embodiment shown in FIG. 6 of the present disclosure;

FIGS. 13A, 13B, 13C, and 13D are views illustrating various pointing gestures used for controlling a user interface using an image which is obtained by a camera according to the embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
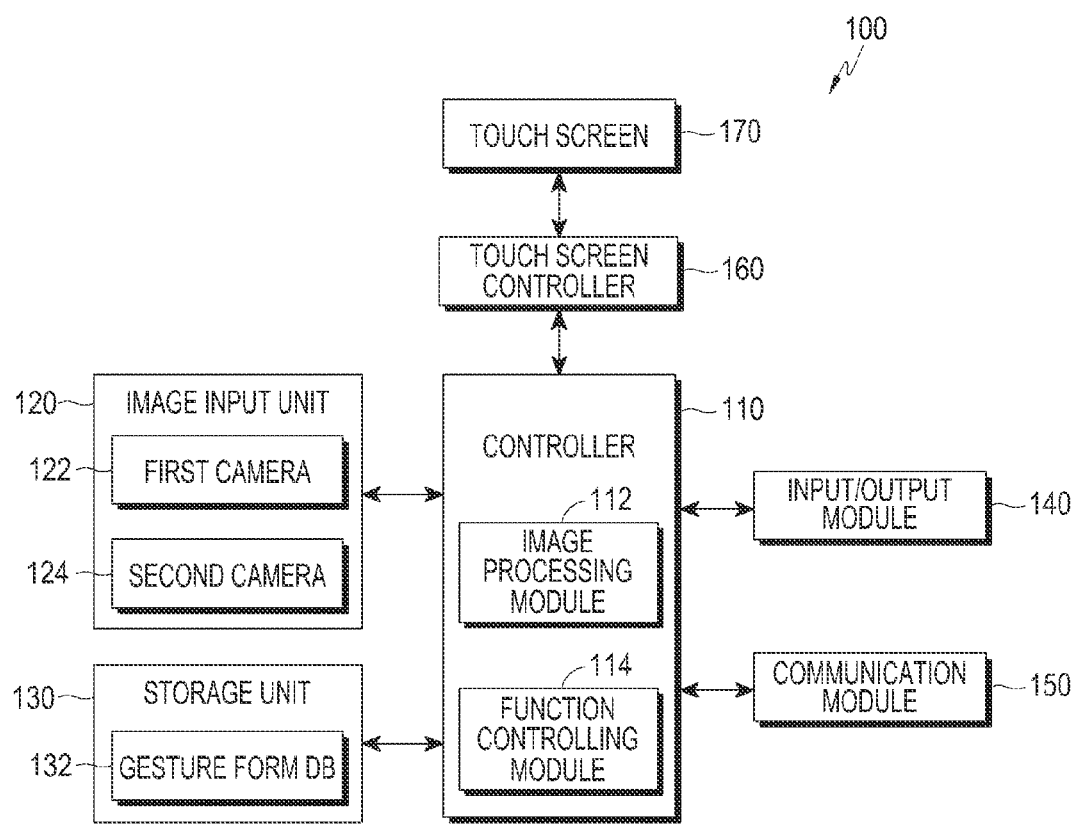
FIG. 1 is a block diagram illustrating an electronic device for controlling a user interface using an input image according to an embodiment of the present disclosure.

FIG. 1 is a block diagram illustrating an electronic device for controlling a user interface using an input image according to an embodiment of the present disclosure.

Referring to FIG. 1, the electronic device 100 includes an image input unit 120, a storage unit 130, an input/output module 140, a communication module 150, a display controller 160, a display unit 170 and a controller 110. The storage unit 130 includes a gesture form database 132, and the controller 110 includes an image processing module 112 and a function controlling module 114. Hereinafter, a touch screen controller and a touch screen will be described as examples of the display controller 160 and the display unit 170.

The image input unit 120 receives an input of various images including videos and stationary images. The image input unit 120 includes at least one of a first camera 122 and a second camera 124. Further, an image obtained through the at least one camera will be described as an example of an image input through the image input unit 120.

The image input unit 120 includes at least one of the first camera 122 and the second camera 124, and performs functions of a general digital camera, which include taking stationary images or videos, under a control of the controller 110. Further, the image input unit 120 operates the first camera 122 or the second camera 124 so as to carry out a function of taking images through an image sensor (not shown) included in the corresponding camera.

The input/output module 140 includes at least one of plural buttons (not shown), a microphone (not shown), a speaker (not shown), a vibration motor (not shown), a connector (not shown), and a keypad (not shown).

The buttons 161 may be disposed on a front surface, a side surface or a rear surface of a housing of the electronic device 100, and may include an electric power/lock button (not shown), a volume control button (not shown), a menu button, a home button, and a back button.

The microphone (not shown) receives an input of voice or sound to generate electric signals under a control of the controller 110.

The speaker (not shown) is capable of outputting sound which corresponds to various signals, i.e. radio signals or photographing sound, of the communication module 150 or the image input unit 120, outside of the electronic device 100 under a control of the controller 110. The speaker (not shown) is capable of outputting sounds, i.e. a button operation sound or a ringtone corresponding to a voice call, corresponding to functions which the electronic device 100 performs. One or more speakers (not shown) are arranged at a suitable position or positions on the housing of the electronic device 100.

The vibration motor (not shown) is capable of converting electric signals into mechanical vibrations under a control of the controller 110. For example, the electronic device 100 which stays in a vibration mode operates the vibration motor (not shown) when receiving a voice call from another device (not shown). One or more vibration motors (not shown) may be arranged in the housing of the electronic device 100. The vibration motor (not shown) is capable of operating in response to a touch operation of a user who touches the touch screen 170, and a continuous movement of a touch on the touch screen 170.

The connector (not shown) may be used as an interface to connect the electronic device 100 to an external device (not shown) or electric power source (not shown). The electronic device 100 transmits data which is stored in the storage unit 130 of the electronic device 100, to the external device (not shown) through a wired cable connected to the connector (not shown), or receives data from the external device (not shown), under a control of the controller 110. Further, the electronic device 100 is supplied with electric power from the electric power source (not shown) through a wired cable connected to the connector (not shown), or is capable of charging a battery (not shown) by using the electric power source.

The keypad (not shown) receives a key input of a user in order to control the electronic device 100. The keypad (not shown) includes a physical keypad (not shown) arranged on the electronic device 100 or a virtual keypad (not shown) displayed on the touch screen 170. The physical keypad (not shown) arranged on the electronic device 100 may be excluded according to the performance or structure of the electronic device 100.

The communication module 150 may include a mobile communication module (not shown), a wireless LAN module (not shown), and a short-range communication module (not shown).

The mobile communication module (not shown) allows the electronic device 100 to be in contact with the external terminal through a mobile communication system by using one or more antennas (not shown) under a control of the controller 110. The mobile communication module (not shown) transmits and receives radio signals for a voice call, a video call, a Short Message Service (SMS), or a Multimedia Message Service (MMS) to/from a portable phone (not shown), a smart phone (not shown), a tablet PC, or other devices (not shown) which have telephone numbers input into the electronic device 100.

The wireless LAN module (not shown) may be connected to the Internet at a location in which the wireless Access Point (AP, not shown) is installed, under a control of the controller 110. The wireless LAN module (not shown) supports the wireless LAN provision, i.e. IEEE802.11x, of the Institute of Electrical and Electronics Engineers (IEEE). The short-range communication module (not shown) may include a Bluetooth communication module and the like, and allows the electronic device 100 to wirelessly carry out the short-range communication with another electronic device, under a control of the controller 210.

The electronic device 100 may include at least one of the mobile communication module (not shown), the wireless LAN module (not shown) and the short-range communication module (not shown) as the communication module 150 according to the performance thereof. For example, the communication module 150 may include a combination of the mobile communication module (not shown), the wireless LAN module (not shown) and the short-range communication module (not shown) according to the performance of the electronic device 100.

The touch screen 170 receives an operation of a user, and displays an executed application program, an operation state, and a menu state. The touch screen 170 provides a user with a User Interface (UI) corresponding to various services, i.e. a voice call, a data transmission, broadcasting, and photographing. The touch screen 170 can transmit analog signals, which correspond to at least one touch input into the UI, to the touch screen controller 160. The touch screen 170 can receive at least one touch through a touchable input means, i.e. a finger or an electronic pen such as a stylus pen. Further, the touch screen 170 may receive a continuous movement of at least one touch among the touches. The touch screen 170 can transmit analog signals, which correspond to the continuous movement of the input touch, to the touch screen controller 160.

Further, the touch screen 170 may be implemented, for example by a resistive type, a capacitive type, an Electro Magnetic Resonance (EMR) type, an infrared type, or an acoustic wave type of touch screen.

Furthermore, a touch of the present disclosure is not limited to a direct contact of a finger or electronic pen with the touch screen 170, and may include a non-contact touch. A detectable distance from the touch screen 170 is changeable according to a performance or a structure of the electronic device 100, and especially the touch screen 170 is configured to distinctively output a touch event by a contact of the finger or the electronic pen and the non-contact touch input. In other words, the touch screen 170 recognizes values, i.e. electric current values, of the touch event and the hovering event in order to distinguish the hovering event from the touch event. In addition, it is preferred that the touch screen 170 distinctively outputs a recognized value, i.e. an electric current value, depending on a distance between the touch screen 170 and a space in which the hovering event is generated.

On the other hand, the touch screen controller 160 converts analog signals received from the touch screen 170 into digital signals, i.e. X and Y coordinates, and transmits the digital signals to the controller 110. The controller 110 is capable of controlling the touch screen 170 by using the digital signals received from the touch screen controller 160. For example, the controller 110 allows a user to select or execute a shortcut icon (not shown) displayed on the touch screen 170 in response to the touch event or the hovering event. Further, the touch screen controller 160 may be included in the controller 110.

The touch screen controller 160 detects a value, i.e. an electric current value, output through the touch screen 170 and identifies a distance between the touch screen 170 and the space in which the hovering event is generated. Then, the touch screen controller 160 converts a value of the identified distance into a digital signal, i.e. a Z coordinate, and provides the controller 110 with the digital signal.

Furthermore, the touch screen 170 may include at least two touch screen panels capable of recognizing the touch and proximity of the finger and the electronic pen respectively, so as to simultaneously receive inputs of the finger touch and the input of the electronic pen. The at least two touch screen panels provide different output values to the touch screen controller 160, and the touch screen controller 160 may differently recognize values input from the at least two touch screen panels so as to distinguish whether the input of the respective touch screens 170 is generated by a finger touch or an input of the electronic pen.

The storage unit 130 stores signals or data which are input/output in correspondence to operations of the image input unit 120, the input/output module 140, the communication module 150, and the touch screen 170, under a control of the controller 110. The storage unit 130 may store a control program and an application for controlling the electronic device 100 or the controller 110.

The term "storage unit" refers to the storage unit 130, the ROM (not shown) and the RAM (not shown) in the controller 110, or a memory card (not shown), i.e. a SD card, and a memory stick, inserted in the electronic device 100. The storage unit may include a non-volatile memory, a volatile memory, a Hard Disk Drive (HDD), and a Solid State Drive (SSD).

Further, the storage unit 130 may include the gesture form database 132 according to the feature of the present disclosure. The gesture form database 132 has at least one predetermined gesture form or at least one gesture form input by the user stored therein. Furthermore, the storage unit 130 stores an accumulated recognition log data constituting the gesture form database, and an operation executing information mapped on each gesture form. The operation executing information mapped on each gesture form may be distinguished and stored according to each function of the electronic device 100 described later.

The controller 110 may include a CPU (not shown), a ROM (not shown) in which a control program for a control of the electronic device 100 is stored, and a RAM (not shown) which stores signals or data input from outside of the electronic device 100, or is used as a storage region for operations performed by the electronic device 100. The CPU (not shown) may include a single core CPU and a multiple core CPU such as a dual core CPU, a triple core CPU and a quad core CPU. The CPU (not shown), the ROM (not shown) and the RAM (not shown) are connected to one another through an internal bus.

The controller 110 controls the image input unit 120, the storage unit 130, the input/output module 140, the communication module 150, the touch screen controller 160, and the touch screen 170.

Further, the controller 110 may include an image processing module 112 and a function controlling module 114 according to the feature of the present disclosure. The image processing module 112 extracts a contour of an image received from the image input unit 120 in order to recognize a gesture form, and detects the gesture form. The function controlling module 114 identifies operation executing information mapped on the detected gesture form and executes an operation according to a function which is currently operated based on the detected gesture form. Further, the function controlling module 114 enables a suitable operation to be executed in correspondence to a condition element, i.e. function, of the electronic device which is currently operated, by using an index value obtained from the gesture form DB 132. For example, with respect to identical gesture forms which are detected during the executions of two different applications respectively, respective operations (corresponding to gesture forms) can be executed according to context data of an application.

Further, the controller 110 controls operations according to a combination of the image processing module 112 and the image processing module 112 based on the performance of the electronic device 100. Accordingly, the controller 110 detects a gesture form from an image which is obtained through the image input unit 120, and identifies operation executing information mapped on the detected gesture form according to the currently operated function so as to enable an operation to be executed. At this time, the controller 110 stores operation executing information corresponding to each of one or more gesture forms into the gesture form DB 132, i.e. the storage unit 130, according to each of functions.

Figure 2:
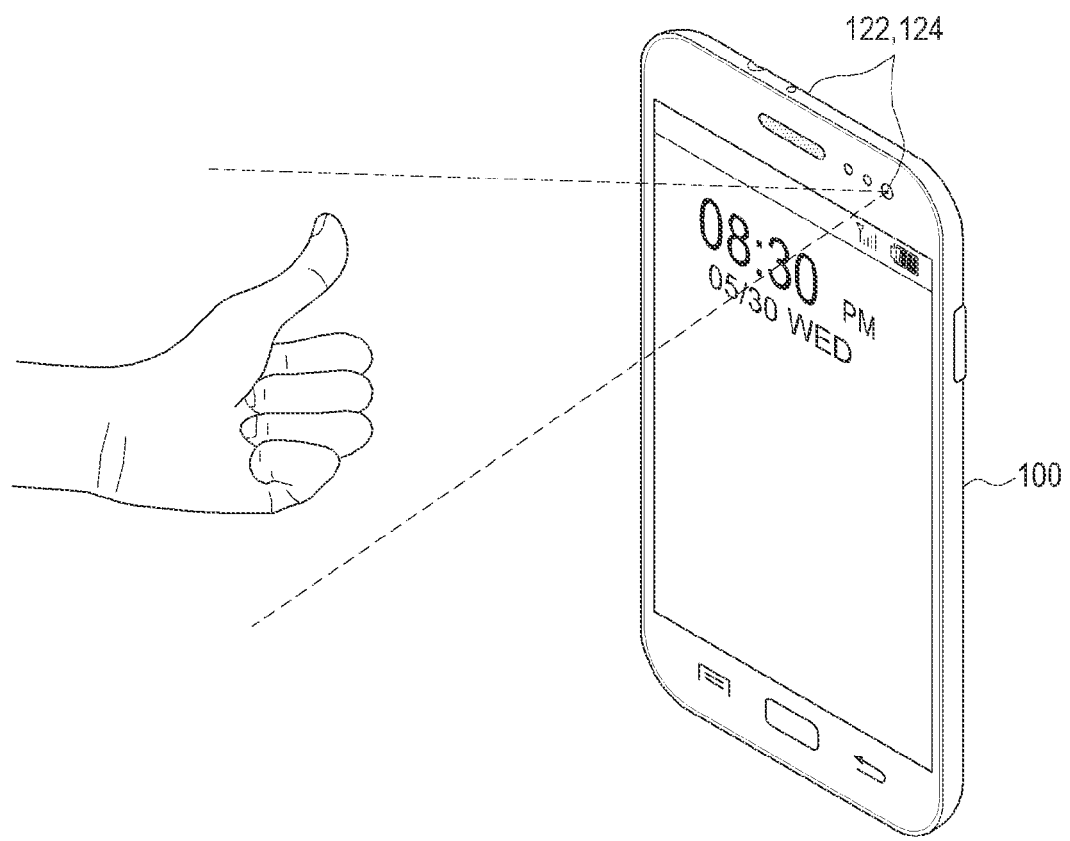
FIG. 2 is a view illustrating an operation of controlling a user interface using an image which is obtained by a camera according to an embodiment of the present disclosure.

FIG. 2 is a view illustrating an operation of controlling the user interface using an image which is obtained through a camera according to an embodiment of the present disclosure.

Referring to FIG. 2, in the electronic device 100 to which the operation of the present disclosure is applied, at least one camera 122 or 124 equipped to the electronic device 100 acquires images in real-time, and analyzes the acquired image. Further, in the electronic device 100 which is set to apply the operation of the present disclosure, the operation executing information corresponding to each of one or more gesture forms is stored according to each function. Furthermore, according to the setting of the user, the operation execution information corresponding to each of one or more gesture forms may be stored according to each form. The functions may be various according to the performance of the electronic device 100 and include applications, locking screens, background screens and the like. The gesture form may be various according to a form of a part or whole of a human body and include a gesture with a hand and a gesture with a foot. Further, the operation executing information may be various operations of the electronic device 100 such as a display of a visible effect, conversion of a screen, a pause, a termination of a screen and the like. In the case where a user makes a certain gesture shown in FIG. 2 while using the electronic device 100 under a setting condition described above, the electronic device 100 obtains an image including the certain gesture and detects the certain gesture form from the obtained image. Then, it is possible to identify the operation executing information mapped on the detected gesture form so as to execute the operation.

Figure 3:
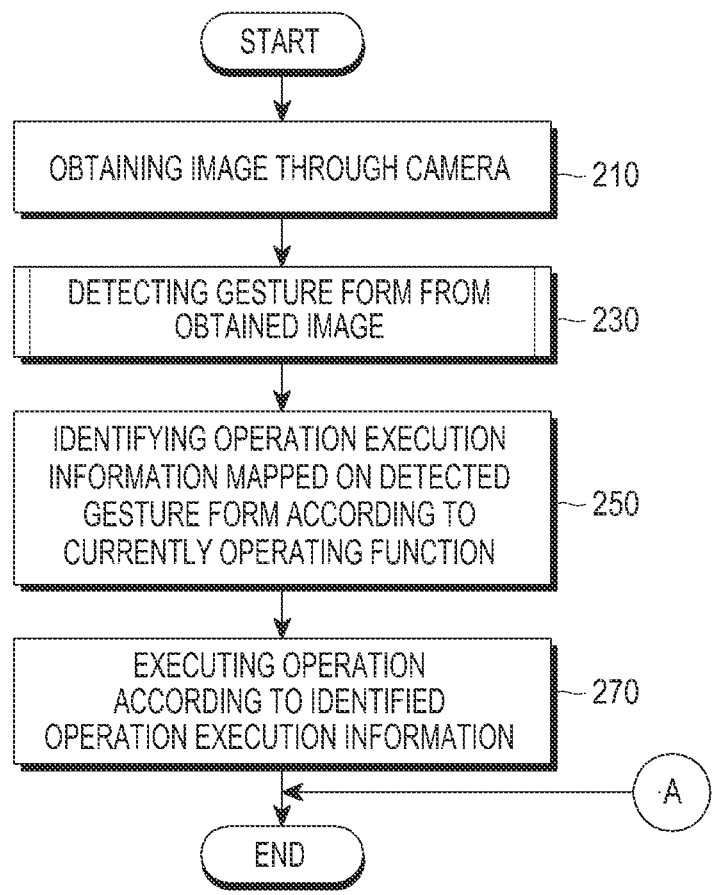
FIG. 3 is a flowchart illustrating an operation of controlling a user interface using an image which is obtained by a camera according to a first embodiment of the present disclosure.

FIG. 3 is a flowchart illustrating an operation of controlling the user interface using an image which is obtained by a camera according to a first embodiment of the present disclosure.

Referring to FIG. 3, in operation 210, an image is obtained through the camera. In operation 230, a gesture image is detected from the obtained image. At this time, the gesture form may be detected from the gestures with a hand as shown in FIGS. 4A to 4C, and in addition various gesture forms may be obtained depending on the various gestures.

Figures 4A, 4B, 4C:
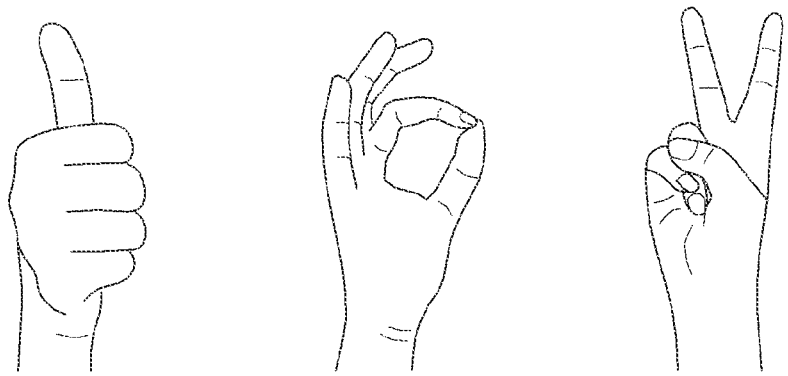
FIGS. 4A, 4B, and 4C are views illustrating various gestures used for controlling a user interface using an image which is obtained by a camera according to an embodiment of the present disclosure.

FIGS. 4A, 4B, and 4C are views illustrating various gestures used for controlling a user interface using an image which is obtained by a camera according to an embodiment of the present disclosure.

An operation of detecting the gesture form from the image obtained in operation 230 will be described with reference to FIG. 5, below.

Figure 5:
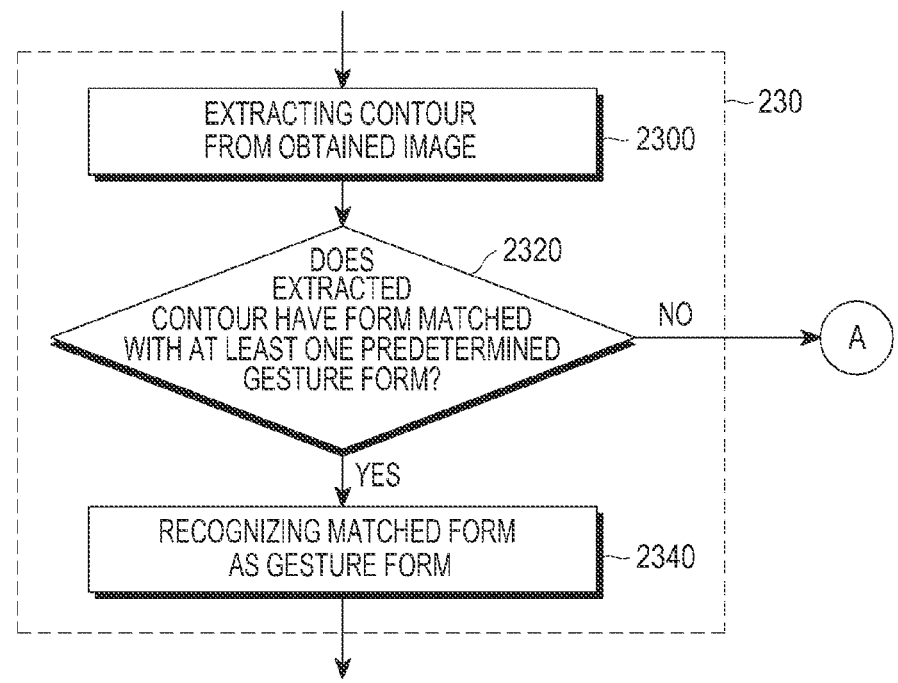
FIG. 5 is a flowchart illustrating a process of detecting a gesture from obtained images during an operation of controlling a user interface using an obtained image through a camera according to the first embodiment shown in FIG. 3 of the present disclosure.

FIG. 5 is a flowchart illustrating a process of detecting a gesture from obtained images during an operation of controlling a user interface using the obtained image through the camera according to the first embodiment shown in FIG. 3 of the present disclosure.

Referring to FIG. 5, in operation 2300 a contour is extracted from the obtained image. In operation 2320, it is determined whether the extracted contour has a form matched with at least one predetermined gesture form. In operation 2320, when it is determined that the extracted contour has the form matched with the at least one predetermined gesture form ('YES'), operation 2340 is carried out. To the contrary, in operation 2320, when it is determined that the extracted contour has no form matched with the at least one predetermined gesture form ('NO'), the operation of the present disclosure is finished via connector (A). In operation 2340, the matched form is recognized as the gesture form. In operation 250, the operation executing information mapped on the detected gesture is identified according to the function carried out currently. For example, assuming that a first gesture form is detected during the execution of the first application and the first gesture form is also detected during the execution of the second application, an operation executed by the first application may be different from an operation executed by the second application according to the operation executing information differently stored to correspond to identical gesture forms of each application. In operation 270, an operation is executed according to the identified operation executing information.

Figure 6:
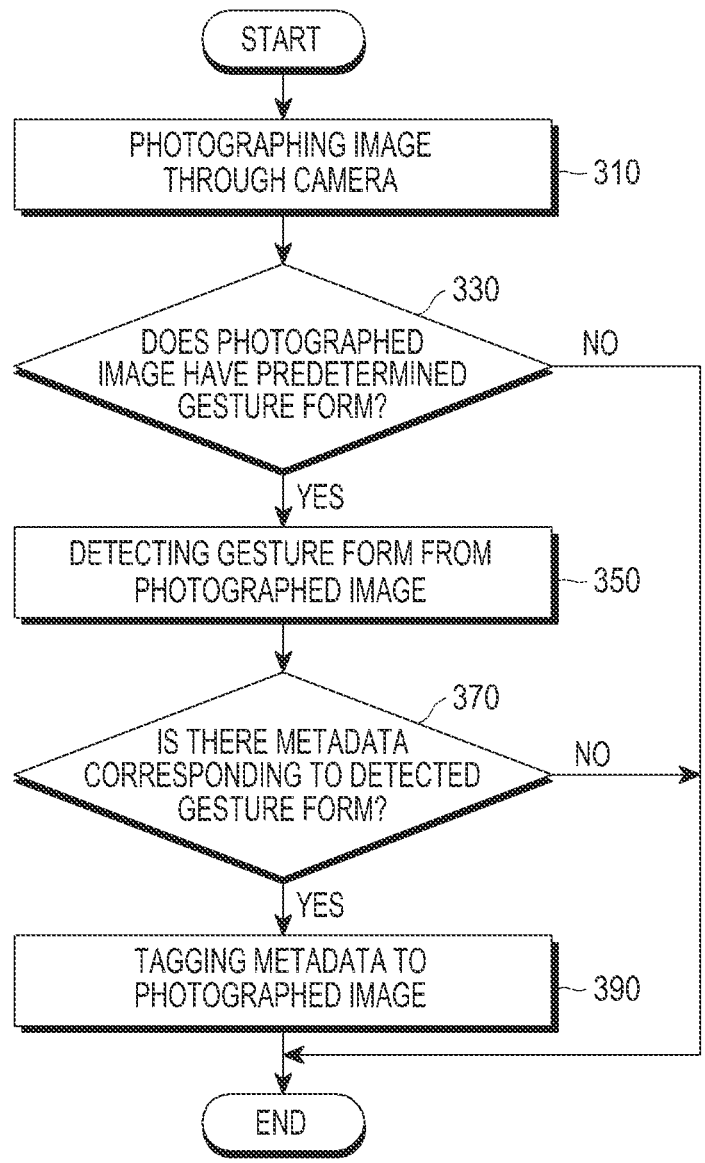
FIG. 6 is a flowchart illustrating a process of controlling a user interface using an image which is obtained by a camera according to a second embodiment of the present disclosure.

FIG. 6 is a flowchart illustrating an operation of controlling a user interface using an image which is obtained by a camera according to a second embodiment of the present disclosure.

Referring to FIG. 6, in operation 310, an image is photographed through the camera. In operation 330, it is determined whether the photographed image corresponds to a predetermined gesture form. Metadata, i.e. name and the like, is allocated to each of the predetermined gesture forms.

FIGS. 7A, 7B, 7C, and 7D are views illustrating various gestures and metadata corresponding to each gesture for controlling a user interface using the image obtained through the camera according to a second embodiment shown in FIG. 6 of the present disclosure.

Referring to FIGS. 7A to 7D, the names may be allocated to the gesture forms respectively. For example, a name 'Oh!' 701 may be allocated to the gesture form shown in FIG. 7A, a name 'Hi-Five' 702 may be allocated to the gesture form shown in FIG. 7B, a name 'peace' 703 may be allocated to the gesture form shown in FIG. 7C, and a name 'clip' 704 may be allocated to the gesture form shown in FIG. 7D. These may be set in manufacturing of the electronic device 100, and may be set such that a user who uses the electronic device 100 inputs favorite hand gestures and designates separate names to the hand gestures. If it is determined that an image taken in operation 330 has a predetermined gesture form ('YES'), operation 350 is carried out. If it is determined that the image taken in operation 330 has no predetermined gesture form ('NO'), the operation of the present disclosure is completed. In operation 350, a gesture image is detected from the taken image. It is determined whether there are metadata corresponding to the gesture form detected in operation 370. If it is determined that there are metadata corresponding to the gesture form detected ('YES'), in operation 370, operation 390 is performed. To the contrary, if it is determined that there is no metadata corresponding to the gesture form detected ('NO') in operation 370, the operation of the present disclosure is finished.

According to the operation of the second embodiment, if one gesture form of the predetermined gesture forms is detected from an image or a video taken through the camera, it is possible to tag the metadata allocated to the detected gesture form to the corresponding image. According to the operation of the second embodiment of the present disclosure, the metadata information such as a name designated by a tag can be utilized as a useful reference when a user separately classifies or searches for desired items from a whole image or video list. Further, in the case of uploading the image or video file to a personal cloud storage or a social network, it is possible to provide continuous experiences regardless of sorts of the electronic devices by maintaining tag property information.

Figure 8:
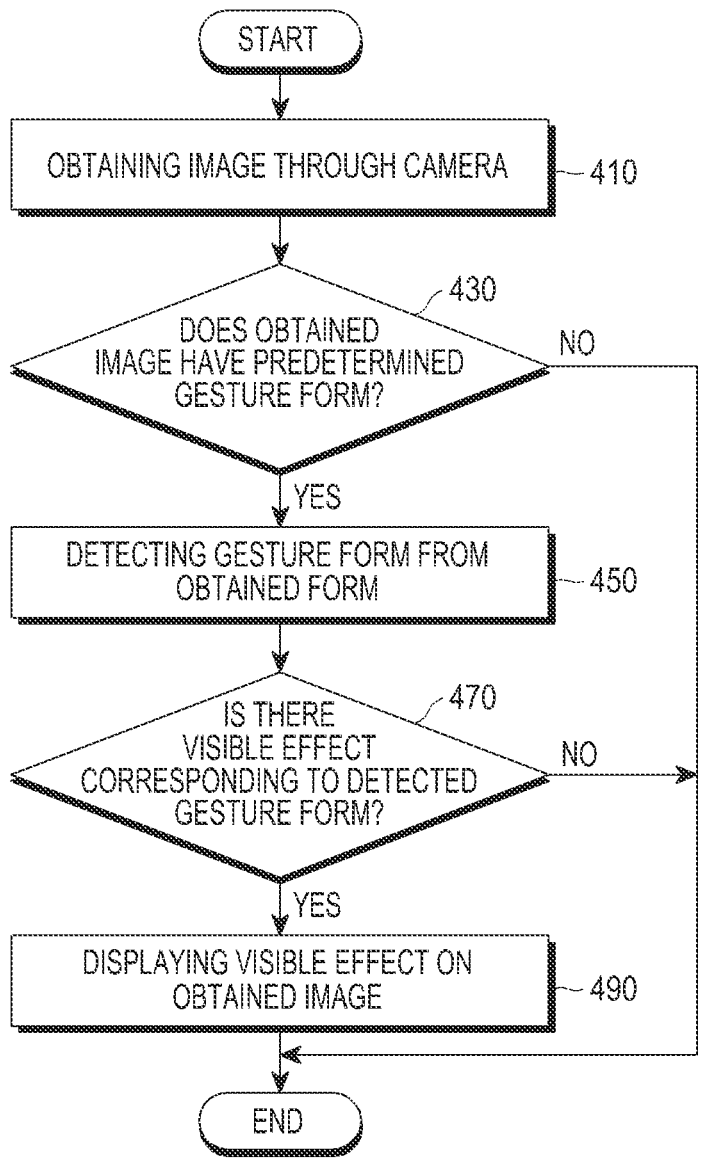
FIG. 8 is a flowchart illustrating a process of controlling a user interface using an image which is obtained by a camera according to a third embodiment of the present disclosure.

FIG. 8 is a flowchart illustrating an operation of controlling a user interface using an image which is obtained by a camera according to a third embodiment of the present disclosure.

Referring to FIG. 8, in operation 410, an image is obtained through the camera. In operation 430, it is determined whether the obtained image has a predetermined gesture form. Various visible effects are designated to the predetermined gesture forms respectively, according to settings such as a color change, a display of a specific image, and the like. Further, the visible effects can be set by an operation of the user. Furthermore, a type, a color, a shape and the like of the visible effects can be changed according to the operation of the user, i.e. a voice instruction and the like. If it is determined that an image taken in operation 430 has a predetermined gesture form ('YES'), operation 450 is carried out. If it is determined that the image taken in operation 430 has no predetermined gesture form ('NO'), the operation of the present disclosure is finished. In operation 450, a gesture form is detected from the obtained image. In operation 470, it is determined whether there is a visible effect corresponding to the detected gesture form. In operation 470, if it is determined that there are the visible effect corresponding to the detected gesture form ('YES'), operation 490 is performed. To the contrary, if it is determined that there is no visible effect corresponding to the detected gesture form ('NO'), in operation 470, the operation of the present disclosure is finished.

Figure 9A:
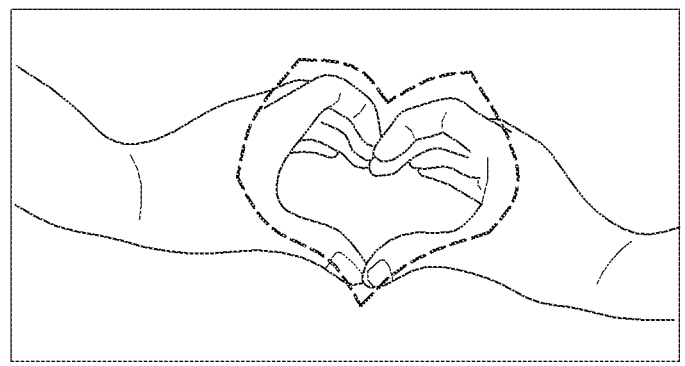
FIGS. 9A and 9B are views illustrating an operation of controlling the user interface using an image which is obtained by a camera according to the third embodiment of the present disclosure.
Figure 9B:
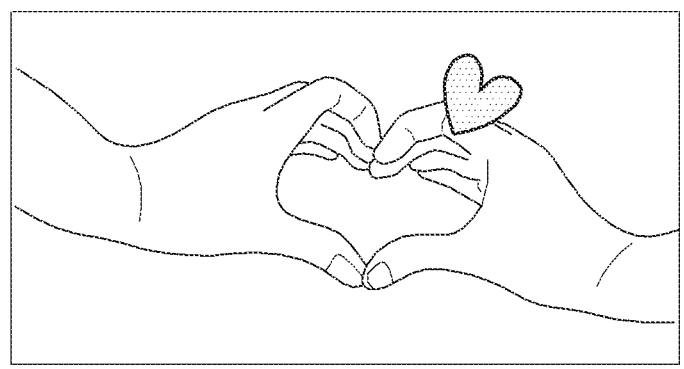

FIGS. 9A and 9B are views illustrating an operation of controlling a user interface using an image which is obtained by a camera according to the third embodiment of the present disclosure.

Referring to FIGS. 9A and 9B, in the case that the gesture form as shown in FIG. 9A is set to display a visible effect of a heart shape, when the gesture form shown in FIG. 9A is detected from an image obtained through the camera, the visible effect of the heart shape corresponding to the obtained image shown in FIG. 9B can be displayed at a predetermined position. At this time, the displayed visible effect can be changed in a position according to the operation of the user, i.e. an operation of touching and dragging the visible effect, inputting a voice instruction, and the like. After a predetermined time lapses, or according to the operation of the user, the display of the visible effect may be stopped.

That is, when one gesture form among the predetermined gesture forms is detected from the image obtained through the camera according to the operation of the third embodiment, the visible effect corresponding to the gesture form detected from the corresponding image can be displayed in real time.

Figure 10:
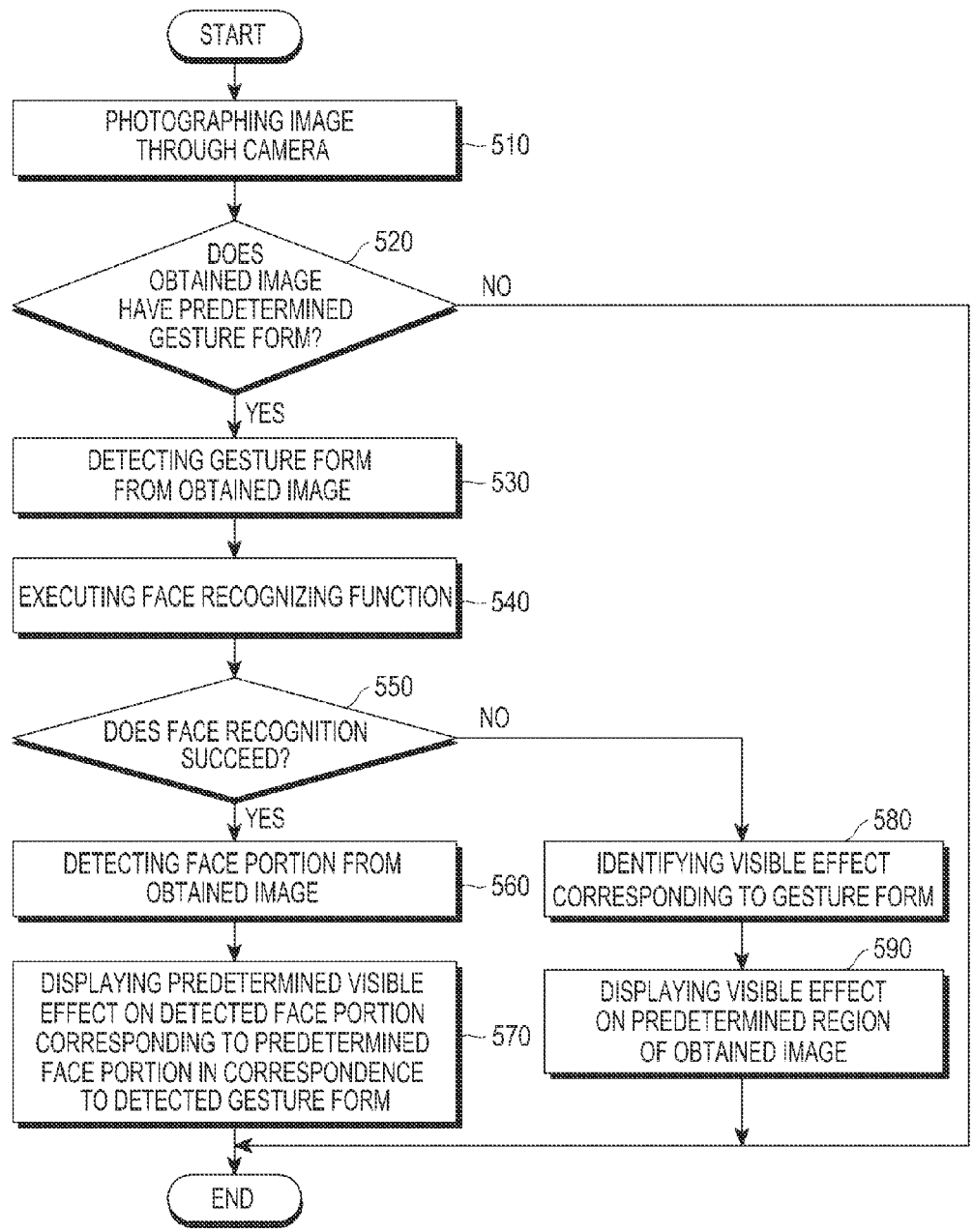
FIG. 10 is a flowchart illustrating a process of controlling a user interface using an image which is obtained by a camera according to a fourth embodiment of the present disclosure.

FIG. 10 is a flowchart illustrating an operation of controlling a user interface using an image which is obtained by a camera according to the second embodiment of the present disclosure.

Referring to FIG. 10, in operation 510, an image is obtained through the camera. In operation 520, it is determined whether the obtained image has a predetermined gesture form. At this time, visible effects may be designated to the predetermined gesture forms respectively, and a position at which the visible effect is displayed may be a certain portion on a face corresponding to each visible effect in connection with a face recognizing function. Further, the visible effect and the position at which the visible effect is displayed can be set or changed according to the operation of the user. In operation 520, if it is determined that the obtained image has a predetermined gesture form ('YES'), operation 530 is carried out. To the contrary, in operation 520 if it is determined that the obtained image has no predetermined gesture form ('NO'), the operation of the present disclosure is finished. In operation 530, a gesture form is detected from the obtained image. In operation 540, the face recognizing function is carried out. In operation 550, it is identified whether the face recognition is a success. In operation 550, if it is determined that the face recognition is a success ('YES'), operation 560 is performed. To the contrary, in operation 550, if it is determined that the face recognition is not a success ('NO'), operation 580 is carried out. In operation 580, a visible effect corresponding to the gesture form is identified. In operation 590, the visible effect is displayed in a predetermined region on the obtained image. In operation 560, a face portion is detected from the obtained image. In operation 570 after 560, the predetermined visible effect is displayed on the detected face portion corresponding to the predetermined face portion in correspondence to the detected gesture form.

Figure 11A:
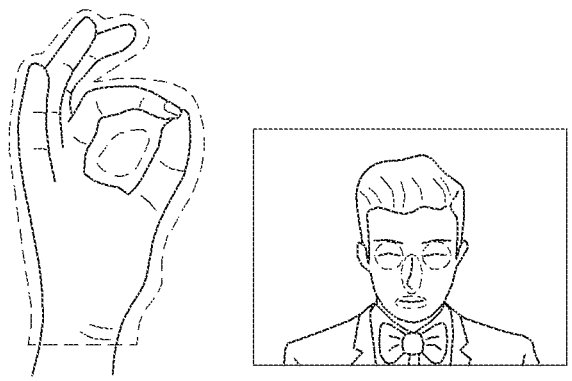
FIGS. 11A and 11B are views illustrating an operation of controlling a user interface using an image which is obtained by a camera according to the fourth embodiment of the present disclosure.
Figure 11B:
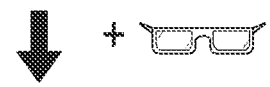
Figure 11B:
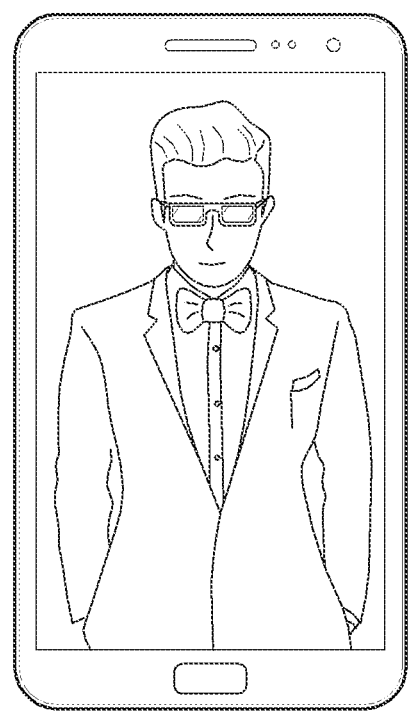

FIGS. 11A and 11B are views illustrating an operation of controlling a user interface using an image which is obtained by a camera according to a fourth embodiment of the present disclosure.

Referring to FIGS. 11A and 11B, in the case where a position at which a visible effect corresponding to the detected gesture form is sunglasses and a position at which a visible effect corresponding to the detected gesture form is an eye portion, according to the detected gesture form and the detected face portion as shown in FIG. 11A, a visible effect such as sunglasses is displayed on the eyes, according to the operation of the fourth embodiment of the present disclosure. Then, although a gesture form is not detected from the image obtained through the camera and the eye portion moves along with a movement of a user, the visible effect of the sunglasses may be continuously displayed on the eye portion when the display of the visible effect is not finished in a predetermined time or by the user. Further, in the state that the visible effect of the sunglasses is displayed on the eyes of the user, if a photographing of an image is carried out, an image in which the visible effect of the sunglasses is displayed on the eyes of a person can be stored on the photographed image.

That is, according to the operation of the third embodiment, when one gesture form among the predetermined gesture forms is detected from the image obtained through the camera, the visible effect corresponding to the gesture form detected from the corresponding image can be displayed. Further, a face portion is detected by using the face recognizing function, so that the visible effect can be displayed on the detected face portion.

Figure 12:
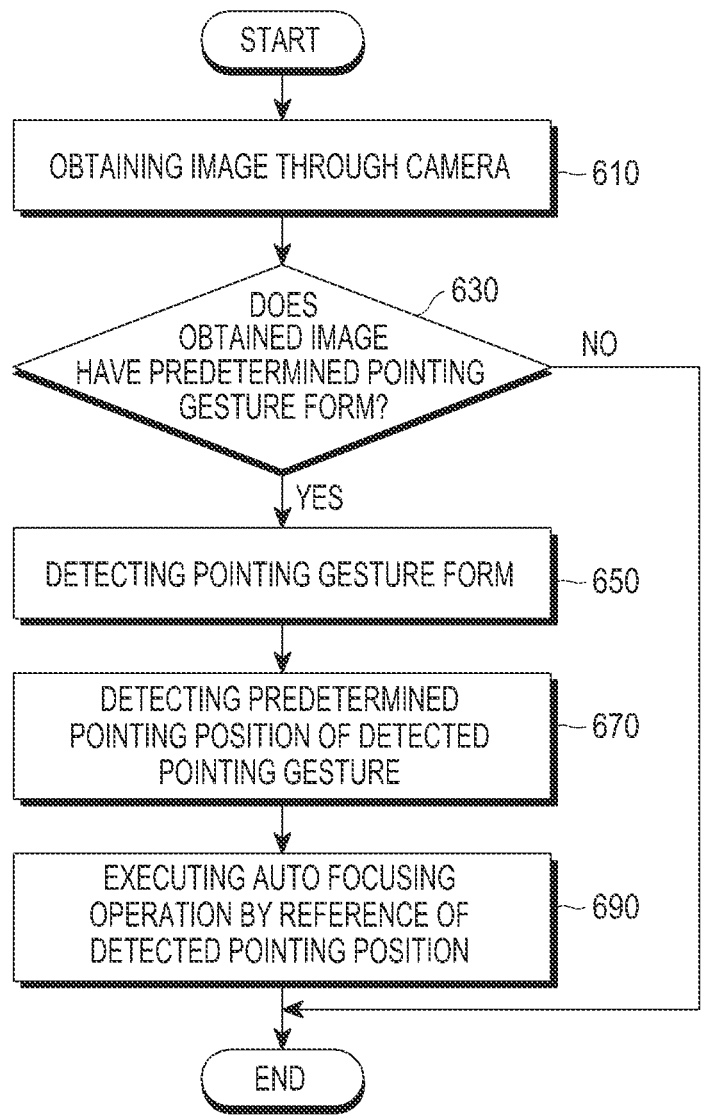
FIG. 12 is a flowchart illustrating a process of controlling a user interface using an image which is obtained by a camera according to a fifth embodiment of the present disclosure.

FIG. 12 is a flowchart illustrating a process of controlling a user interface using an image which is obtained through a camera according to a fifth embodiment of the present disclosure.

Referring to FIG. 12, in operation 610, first, an image is obtained through the camera and displayed on a preview screen. In operation 630, it is determined whether the obtained image has a predetermined pointing gesture form. At this time, execution information for operating an auto-focusing of the camera is stored in the predetermined pointing gesture form. More particularly, the information for executing the auto-focusing operation is stored by a reference of the predetermined pointing position of the pointing gesture form. At this time, the pointing gesture form may be detected from various hand gestures as shown in FIGS. 13A to 13D, and in addition various pointing gesture forms may be obtained depending on the various pointing gestures.

FIGS. 13A, 13B, 13C, and 13D are views illustrating various pointing gestures used for controlling a user interface using an image which is obtained by a camera according to the fifth embodiment of the present disclosure.

In operation 630, if it is determined that the obtained image has a predetermined pointing gesture form ('YES'), operation 650 is carried out. To the contrary, in operation 630, if it is determined that the obtained image has no predetermined pointing gesture form ('NO'), the operation of the present disclosure is finished. In operation 650, a pointing gesture image is detected. In operation 670, a predetermined pointing position of the detected pointing gesture form is detected. In operation 690, an auto-focusing operation is carried out by a reference of the detected pointing position.

FIGS. 14A, 14B, 14C, and 14D are views illustrating an operation of controlling a user interface using an image which is obtained by a camera according to the fifth embodiment of the present disclosure.

Figure 14A:
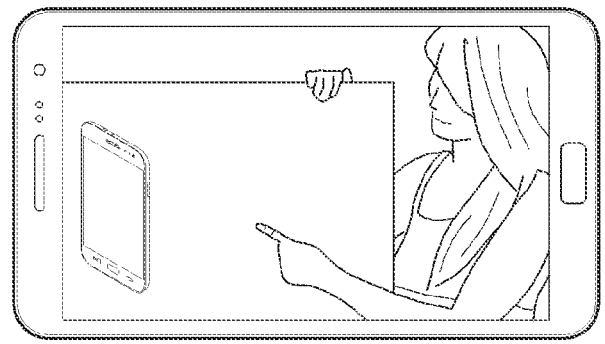
FIGS. 14A, 14B, 14C, and 14D are views illustrating an operation of controlling a user interface using an image which is obtained by a camera according to the fifth embodiment of the present disclosure.
Figure 14B:
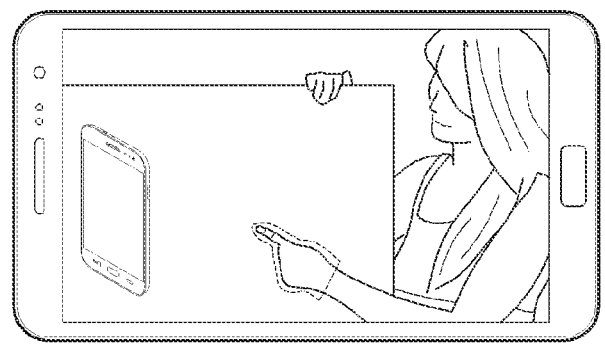
Figure 14C:
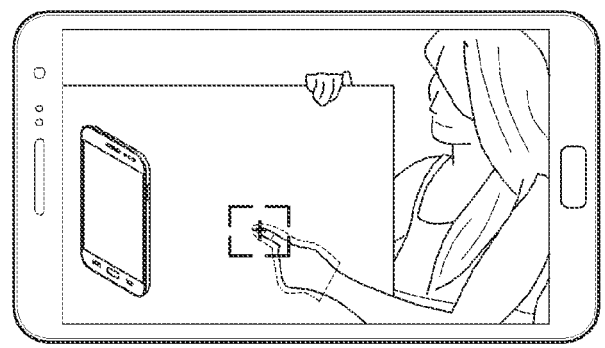
Figure 14D:
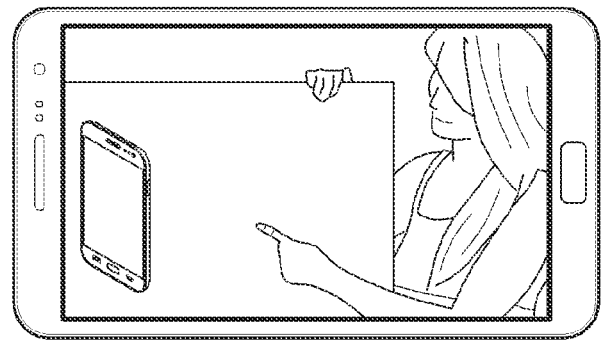

Referring to FIGS. 14A to 14D, in the case that a person obtains a pointing gesture by using the camera as shown in FIG. 14A, a pointing gesture form as shown in FIG. 14B is detected depending on an operation according to the fifth embodiment of the present disclosure, and then an auto-focusing operation is carried out around a position which the pointing gesture form indicates as shown in FIG. 14C, i.e. a predetermined position of a pointing gesture. Then, when an image photographing mode is executed, an image is photographed and it is possible to store the image as shown in FIG. 14D.

That is, according to the operation of the fifth embodiment, if the predetermined pointing gesture form is detected from the obtained image through the camera in a camera function mode, the predetermined pointing position of the predetermined pointing gesture form is detected and an auto-focusing operation is executed by a reference of the detected pointing position.

Figure 15:
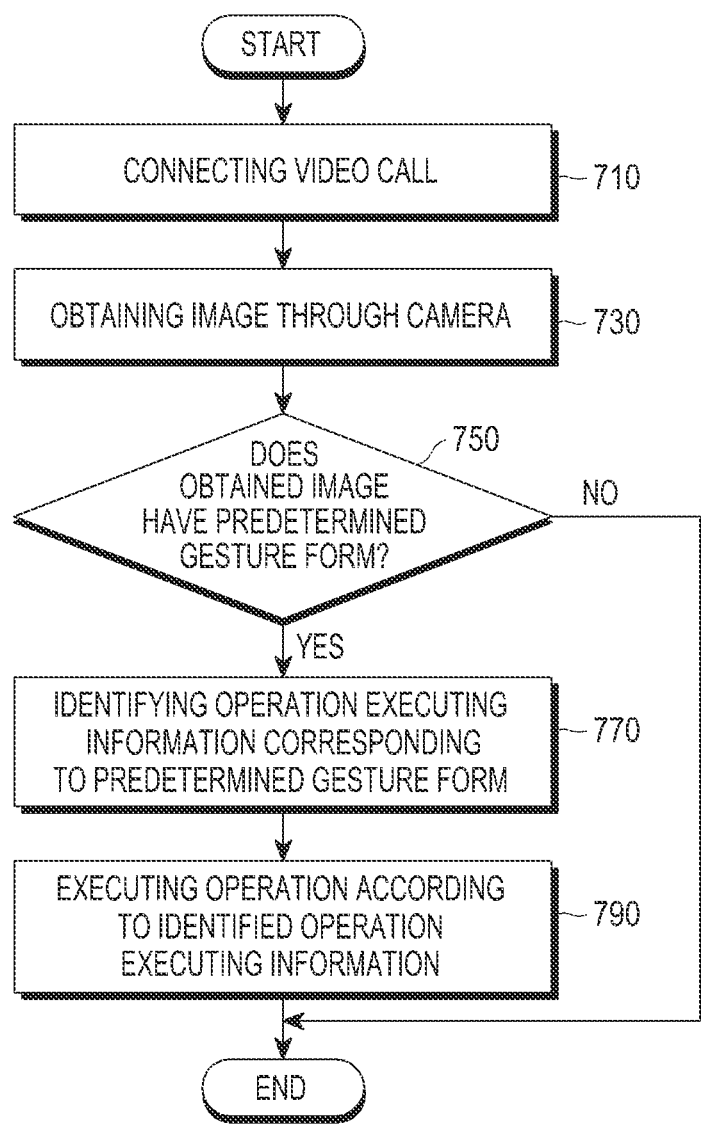
FIG. 15 is a flowchart illustrating a process of controlling a user interface using an image which is obtained by a camera according to a sixth embodiment of the present disclosure.

FIG. 15 is a flowchart illustrating a process of controlling a user interface using an image which is obtained through a camera according to a fifth embodiment of the present disclosure.

Referring to FIG. 15, in operation 710, a video call is connected in order to execute a video communication. In operation 730, an image is obtained through the camera. In operation 750, it is determined whether the obtained image has a predetermined gesture form. Corresponding pieces of the operation executing information are stored in the predetermined gesture forms, respectively. Further, the operation executing information may be set or changed according to the operation of the user. The operation executing information is in various forms such as a substitution of an image with a photograph, a conversion of front and rear cameras, a recording, a transmission of a visible effect, and the like. If it is determined that an image taken in operation 750 has a predetermined gesture form ('YES'), operation 770 is carried out. To the contrary, if it is determined that the image taken in operation 750 has no predetermined gesture form ('NO'), the operation of the present disclosure is finished. In operation 770, the operation executing information corresponding to the predetermined gesture form is identified. In operation 790, an operation is executed according to the identified operation executing information.

Figure 17A:
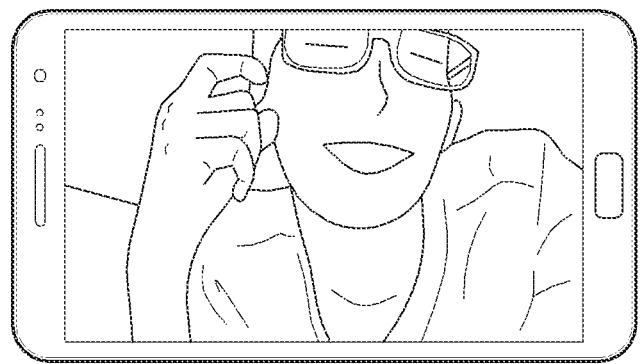
FIGS. 17A, 17B, and 17C are views illustrating an operation of controlling a user interface using an image which is obtained by a camera according to the sixth embodiment of the present disclosure.
Figure 17B:
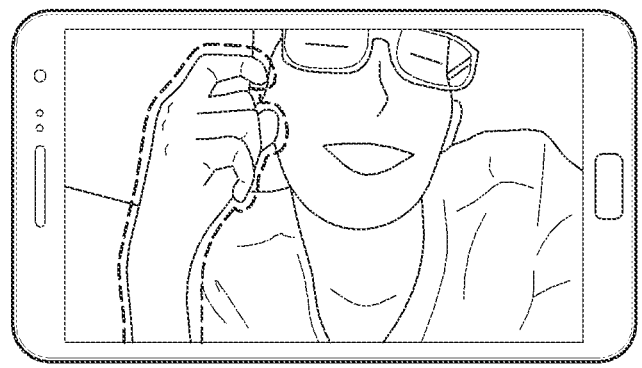
Figure 17C:
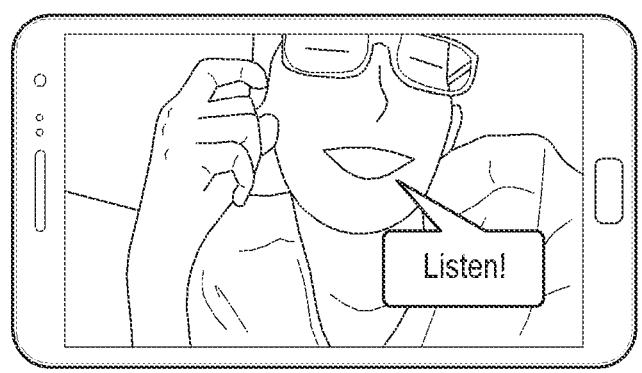

FIGS. 17A, 17B, and 17C are views illustrating an operation of controlling the user interface using an image which is obtained by a camera according to the sixth embodiment of the present disclosure.

Referring to FIGS. 17A to 17C, in the case that an image in which a person makes a gesture is obtained by using the camera as shown in FIG. 17A, the gesture form of FIG. 17B is detected depending on an operation according to the sixth embodiment of the present disclosure, and then an operation of displaying a visible effect which is operation executing information corresponding to the gesture form is executed as shown in FIG. 17C. The displayed visible effect is enabled to be displayed on an electronic device of a companion in communication with the user's electronic device 100, as well as the user's electronic device 100.

Figure 16:
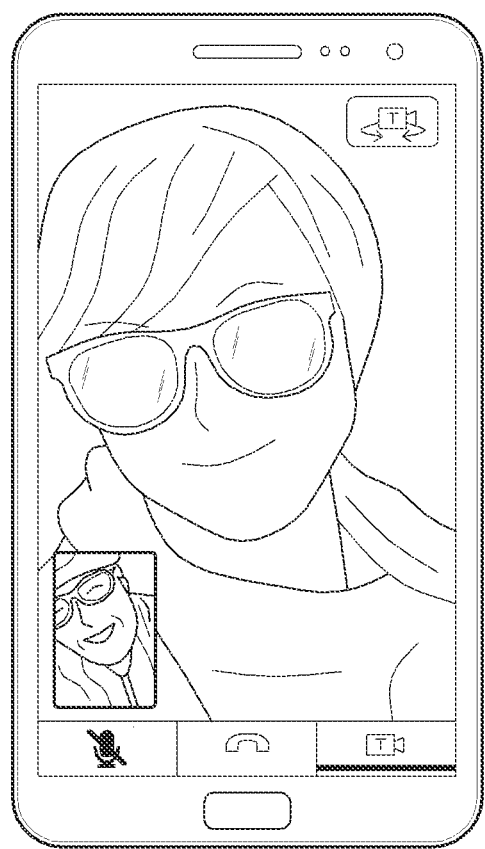
FIG. 16 is a view illustrating an operation of controlling a user interface using an image which is obtained by a camera according to the sixth embodiment of the present disclosure, in which a control operation is applied to an electronic device.

That is, according to the operation of the sixth embodiment, if one gesture form among the predetermined gesture forms is detected from an image obtained through the camera during an execution of a video communication function as shown in FIG. 16, an operation corresponding to the detected gesture form can be executed.

FIG. 16 is a view illustrating an operation of controlling a user interface using an image which is obtained by a camera according to the sixth embodiment of the present disclosure, in which the control operation is applied to an electronic device.

Figure 18:
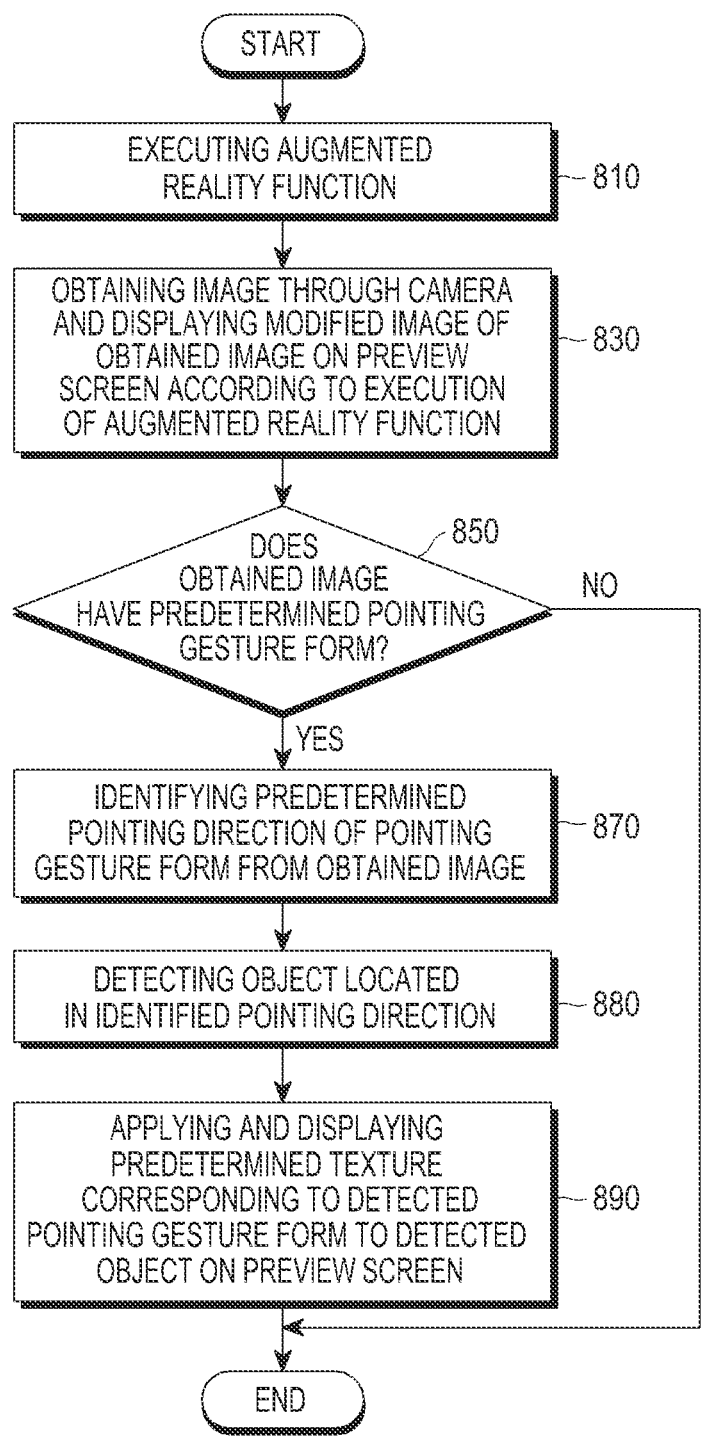
FIG. 18 is a flowchart illustrating a process of controlling the user interface using an image which is obtained by a camera according to a seventh embodiment of the present disclosure.

FIG. 18 is a flowchart illustrating an operation of controlling a user interface using an image which is obtained through a camera according to a seventh embodiment of the present disclosure.

Referring to FIG. 18, first, in operation 810, an Augmented Reality (AR) function is executed. According to the execution of the AR function, an image obtained through the camera is displayed on a preview screen differently from an actual image, as shown in FIG. 19.

Figure 19:
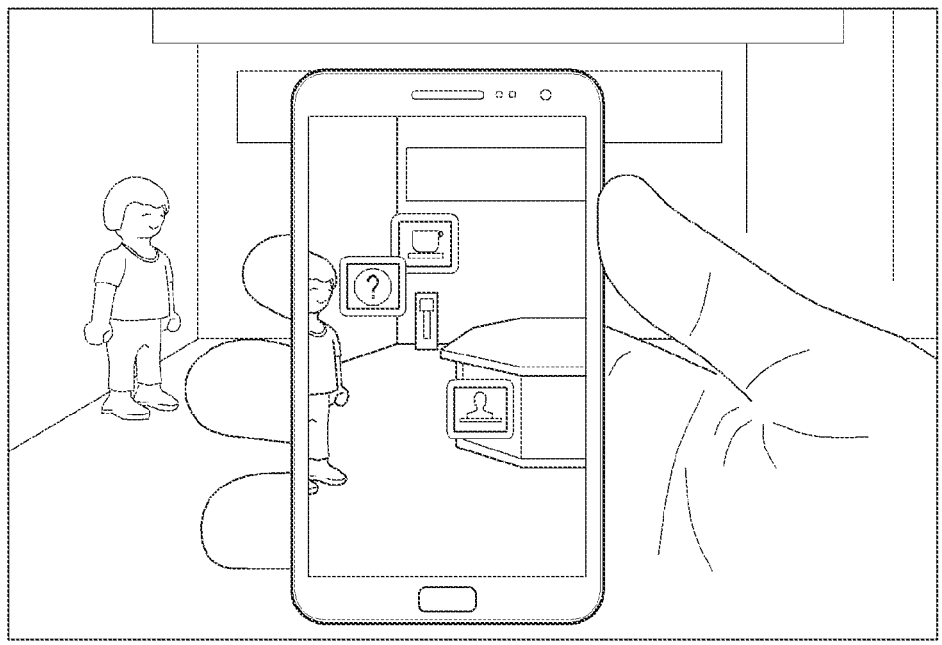
FIG. 19 is a first view illustrating an operation of controlling a user interface using an image which is obtained by a camera according to the seventh embodiment of the present disclosure.

FIG. 19 is a first view illustrating an operation of controlling the user interface using an image which is obtained by a camera according to the seventh embodiment of the present disclosure.

In operation 830, an image is obtained through the camera, and a modified image of the obtained image is displayed on the preview screen according to the execution of the AR. In operation 850, it is determined whether the obtained image has a predetermined pointing gesture form. Various pieces of texture information may be designated to the predetermined pointing gesture forms, respectively. Further, the texture information may be set or changed according to the operation of the user. In operation 850, if it is determined that the obtained image has the predetermined pointing gesture form ('YES'), operation 870 is carried out. To the contrary, in operation 850, if it is determined that the obtained image has no predetermined pointing gesture form ('NO'), the operation of the present disclosure is finished. In operation 870 after 850, a predetermined pointing direction of the pointing gesture form is identified from the obtained image. In operation 880, an object located in the identified pointing direction is detected. At this time, the detection of the object can be executed by using various recognition functions. In operation 890, a predetermined texture corresponding to the detected pointing gesture form is applied to the detected object.

Figure 20:
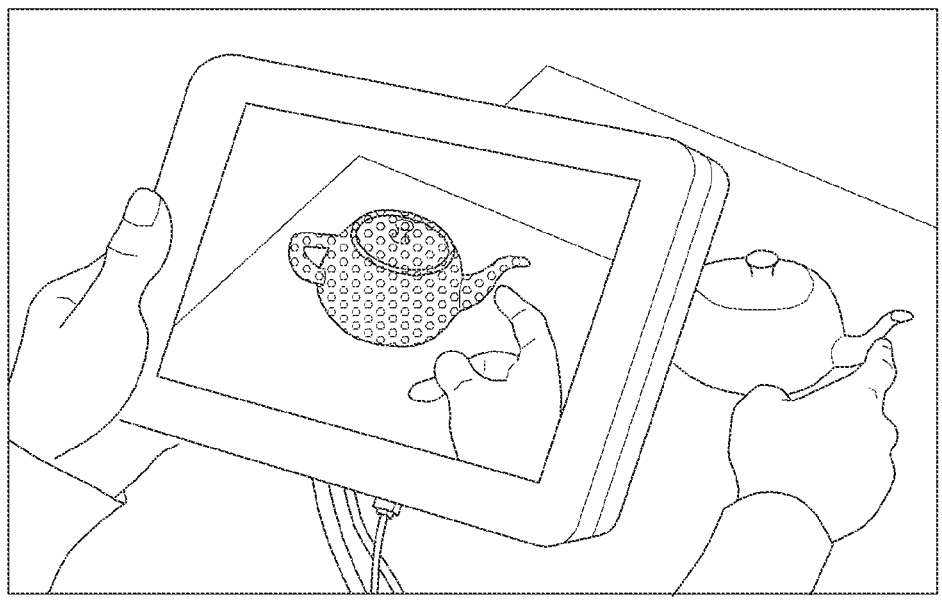
FIG. 20 is a second view illustrating an operation of controlling a user interface using an image which is obtained by a camera according to the seventh embodiment of the present disclosure.

FIG. 20 is a second view illustrating an operation of controlling the user interface using an image which is obtained by a camera according to the seventh embodiment of the present disclosure.

Referring to FIG. 20, in the case that an image in which a pointing gesture is made is obtained by using the camera according to the execution of the AR function as shown in FIG. 20, the pointing gesture form is detected depending on an operation according to the seventh embodiment of the present disclosure, and the texture corresponding to the pointing gesture form can be applied to an object located in the predetermined pointing direction of the detected pointing gesture form.

That is, if one pointing gesture form among the predetermined pointing gesture forms is detected from an image obtained from the camera when the AR function is executed according to the operation of the seventh embodiment, the object located in the predetermined pointing direction of the detected pointing gesture is detected, and the predetermined texture corresponding to the detected pointing gesture form is applied to the detected object.

As described above, it is possible to achieve an operation of controlling the user interface by using the image obtained through the camera according to the embodiment of the present disclosure. With the operations described in the specification, all or some operations are simultaneously executed in parallel, or some operations are omitted. Furthermore, the operations may include other additional operations.

In addition, the electronic device 100 may store identical operation executing information of each gesture form for all functions, and is set to allow the user to store the identical operation executing information of each gesture form with respect to all functions.

Further, in the state that the visible effect is displayed on an image obtained through the camera according to the third embodiment, when it is executed to take a photograph of an image according to the operation of the user, the obtained image is taken and an image on which the visible effect is displayed can be stored.

Further, in the fourth embodiment, although the operation is described of displaying the predetermined visible effect corresponding to the detected gesture form on a detected face portion according to the execution of the face recognition, the predetermined visible effect corresponding to the detected gesture form may be displayed on the predetermined portion of a recognized object by applying various recognizing functions as well as the face recognition function and recognizing various objects.

Furthermore, with relation to the AR function of the seventh embodiment, although it is described to apply a texture to only the object located in a pointing direction of the pointing gesture form, the texture may be applied to the whole screen.

In addition, with relation to the AR function of the seventh embodiment, although it is described to apply the pointing gesture form and the predetermined texture corresponding to the pointing gesture form, it is possible to provide various gesture forms to the AR function according to a user's setting or a setting in a manufacturing of the electronic device 100, and also it is possible to apply various operations corresponding to the gesture form to the AR function.

It will be appreciated that the various embodiments of the present disclosure may be implemented in a form of hardware, software, a combination of hardware and software. Regardless of being erasable or re-recordable, such an optional software may be stored in a non-volatile storage device such as a ROM, a memory such as an RAM, a memory chip, a memory device, or an integrated circuit, or a storage medium such as a CD, a DVD, a magnetic disc, or a magnetic tape that is optically or electromagnetically recordable and readable by a machine, for example, a computer. It will be appreciated that a memory, which may be incorporated in a portable terminal, may be an example of a machine-readable storage medium which is suitable for storing a program or programs including commands to implement the various embodiments of the present disclosure. Therefore, various embodiments of the present disclosure provide a program including codes for implementing a system or method claimed in any claim of the accompanying claims and a machine-readable device for storing such a program. Moreover, such a program as described above can be electronically transferred through an arbitrary medium such as a communication signal transferred through cable or wireless connection, and the present disclosure properly includes the things equivalent to that.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a user interface using an input image, the method comprising:
    detecting a gesture from the input image;
    identifying a function which currently operates on an electronic device;
    identifying an operation executing information mapped to the detected gesture according to the function which is currently operating; and
    executing an operation of the operation executing information,
    wherein, when the operation executing information mapped on the detected gesture is identified and the operation of the operation executing information is executed, information for classification or search corresponding to the detected gesture is tagged to the input image.

2. The method of controlling the user interface as claimed in claim 1, wherein the detecting of the gesture from the input image comprises:
    extracting a contour from the input image;
    determining whether the extracted contour is matched with one of one or more gestures; and
    recognizing a matched gesture as the gesture if it is determined that the extracted contour is matched with one of the one or more gestures.

3. The method of controlling the user interface as claimed in claim 1, wherein the operating function corresponds to a camera function, and if the detected gesture is a predetermined pointing gesture, the identifying of the operation executing information mapped on the detected gesture so as to execute the operation of the operation executing information comprises:
    detecting a point on the input image based on the predetermined pointing gesture from the input image; and
    executing an auto focusing operation of the camera function by a reference of the detected point.

4. The method of controlling the user interface as claimed in claim 1, wherein, when the operation executing information mapped on the detected gesture is identified and the operation of the operation executing information is executed, a predetermined texture corresponding to the detected gesture is applied to the input image and displayed on a preview screen.

5. The method of controlling the user interface as claimed in claim 1, wherein, if the detected gesture is a predetermined pointing gesture, the identifying of the operation execution information mapped on the detected gesture and executing the operation of the operation execution information comprises:
    detecting at least one object located in a pointing direction of the pointing gesture from the input image; and
    applying a predetermined texture corresponding to the detected gesture to the detected object and displaying it on a preview screen.

6. The method of controlling the user interface as claimed in claim 1,
    wherein the operating function corresponds to an augmented reality function, and
    wherein, when operation executing information mapped on the detected gesture is identified and the operation of the operation executing information is executed, a predetermined function mapped on the detected gesture is executed in the augmented reality image displayed on a preview screen according to an execution of the augmented reality function.

7. The method of controlling the user interface as claimed in claim 1, wherein, when the operation executing information mapped on the detected gesture is identified and the operation of the operation executing information is executed, a predetermined visual effect corresponding to the detected gesture is displayed on the input image.

8. The method of controlling the user interface as claimed in claim 7, further comprising:
    detecting at least one portion on a face in the input image by applying a face recognizing function to the input image,
    wherein in the displaying of the predetermined visual effect corresponding to the detected gesture on the input image, the predetermined visual effect is displayed on the detected face portion corresponding to the predetermined face portion in correspondence to the detected gesture.

9. The method of controlling the user interface as claimed in claim 7, further comprising:
    changing at least one of a type, a color or a shape of the visual effect according to a recognition of a predetermined voice instruction.

10. An apparatus for controlling a user interface using an input image, the apparatus comprising:
    an image receiving sensor configured to receive an input of an image; and
    at least one processor configured to:
        detect a gesture from an image input through the image receiving sensor,
        identify a function which currently operates on the apparatus,
        identify operation executing information mapped to the detected gesture according the function which is currently operating, and
        execute an operation of the operation executing information,
    wherein the at least one processor is further configured to tag information for classification or search corresponding to the detected gesture to the input image when the operation executing information mapped on the detected gesture is identified and the operation of the operation executing information is executed.

11. The apparatus for controlling the user interface as claimed in claim 10, wherein the at least one processor is further configured to:
    extract a contour from the input image when the gesture is detected from the input image,
    determine whether the extracted contour has a form matched with the gesture, and
    determine the matched gesture as the gesture and detects the gesture if it is determined that the extracted contour has the form matched with one or more gestures.

12. The apparatus for controlling the user interface as claimed in claim 10, wherein the operating function corresponds to a camera function, and the at least one processor is further configured to:
  detect a point on the input image based on a predetermined pointing gesture from the input image if the detected gesture is the predetermined pointing gesture, and
  execute an auto focusing operation of the camera function by a reference of the detected point.

13. The apparatus for controlling the user interface as claimed in claim 10, further comprising:
  a display,
  wherein a predetermined texture corresponding to the detected gesture is applied to the input image displayed on a preview screen of the display, when the operation executing information mapped on the detected gesture is identified and the operation of the operation executing information is executed.

14. The apparatus for controlling the user interface as claimed in claim 10, further comprising:
  a display,
  wherein the at least one processor is further configured to:
    detect at least one object located in a pointing direction of the pointing gesture from the input image displayed on a preview screen of the display if the detected gesture is a predetermined pointing gesture, and
    apply a predetermined texture corresponding to the detected gesture to the detected object.

15. The apparatus for controlling the user interface as claimed in claim 10, further comprising:
  a display,
  wherein the operating function is an augmented reality function, and
  wherein the at least one processor is further configured to execute a predetermined function mapped on the detected gesture in the augmented reality image displayed on a preview screen of the display according to an execution of the augmented reality function.

16. The apparatus for controlling the user interface as claimed in claim 10, further comprising:
  a display,
  wherein the at least one processor is further configured to display the input image and a predetermined visual effect corresponding to the detected gesture of the input image on the display, when the operation executing information mapped on the detected gesture is identified and the operation of the operation executing information is executed.

17. The apparatus for controlling the user interface as claimed in claim 16, wherein the at least one processor is further configured to:
  apply a face recognition function to the input image so as to detect at least one portion of a face from the input image, and
  display the predetermined visual effect on the detected face portion corresponding to the predetermined face portion in correspondence to the detected gesture.

18. The apparatus for controlling the user interface as claimed in claim 16, further comprising:
  a microphone,
  wherein the at least one processor is further configured to change at least one of a type, a color or a shape of the displayed visual effect according to recognition of a predetermined voice instruction input through the microphone.

19. A recording medium for controlling a user interface using an input image, the recording medium comprising:
  an image receiving sensor configured to receive an input of an image;
  a memory; and
  programs which operate at least one processor configured to:
    detect a gesture from an image input through the image receiving sensor,
    identifying a function which currently operates on an electronic device,
    identify an operation executing information mapped on the detected gesture according to the function which is currently operating, and
    execute an operation of the operation executing information,
  wherein, when the operation executing information mapped on the detected gesture is identified and the operation of the operation executing information is executed, information for classification or search corresponding to the detected gesture is tagged to the input image.

20. A method of modifying an input image, the method comprising:
  receiving a gesture via an image receiving sensor;
  matching the gesture to at least one of a plurality of stored gestures; and
  applying an object associated with the matched gesture to the input image and displaying the input image with the applied object, the applied object being a pre-stored image.

21. The method of modifying the input image as in claim 20, wherein the applied object is metadata associated with the matched gesture.

22. The method of modifying the input image as in claim 21, wherein the metadata defines a focus point for an image capture of a camera function.

23. The method of modifying the input image as in claim 20, wherein the applied object is a visible object associated with the matched gesture.

24. The method of modifying the input image as in claim 23, wherein the visible object associated with the matched gesture is an effect rendered from a shape of the matched gesture.

25. The method of modifying the input image as in claim 23, wherein when the input image is a sequence of input images of a video call, the visible object is a message text applied to each input image in the sequence of input images.

26. The method of modifying the input image as in claim 23, wherein the visible object associated with the matched gesture is further associated with a feature of the input image, and the application of the visible object to the input image is performed in a manner that integrates the visible object to the feature of the input image.

27. The method of modifying the input image as in claim 26, wherein the visible object is a pair of glasses and the feature of the input image is a user's face.

28. The method of modifying the input image as in claim 26, wherein the visible object is a texture and the feature of the input image is an object selectively chosen from a plurality of objects in the input image.

* * * * *